(12) United States Patent
Hubbard et al.

(10) Patent No.: US 10,273,119 B2
(45) Date of Patent: Apr. 30, 2019

(54) ELEVATOR LOAD WEIGHING SYSTEM (71) Applicant: OTIS ELEVATOR COMPANY, Farmington, CT (US)

(72) Inventors: James L. Hubbard, Kensington, CT (US); Ismail Agirman, Southington, CT (US); Takashi Onodera, Chiba-ken (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/510,130

(22) PCT Filed: Sep. 10, 2015

(86) PCT No.: PCT/US2015/049333
§ 371 (c)(1),
(2) Date: Mar. 9, 2017

(87) PCT Pub. No.: WO2016/040568
PCT Pub. Date: Mar. 17, 2016

(65) Prior Publication Data
US 2017/0313552 A1   Nov. 2, 2017

Related U.S. Application Data (60) Provisional application No. 62/049,533, filed on Sep. 12, 2014.

(51) Int. Cl.
*B66B 1/34* (2006.01)
*B66B 3/00* (2006.01)
(Continued)

(52) U.S. Cl.
CPC ............ *B66B 5/145* (2013.01); *B66B 1/34* (2013.01); *B66B 1/3476* (2013.01); *B66B 5/14* (2013.01); *G01G 19/52* (2013.01); *G01G 19/14* (2013.01)

(58) Field of Classification Search
CPC ...... B66B 5/145; B66B 1/3476; G01G 19/52; G01G 19/14
(Continued)

(56) References Cited

U.S. PATENT DOCUMENTS 4,754,850 A   7/1988  Caputo
5,067,593 A   11/1991 Tanaka et al.
(Continued)

FOREIGN PATENT DOCUMENTS

EP   1464607 B1   2/2010
FR   1270803 A    9/1961
(Continued)

OTHER PUBLICATIONS

International Search Report for PCT/2015/049333, dated Nov. 11, 2015, pp. 1-4.

*Primary Examiner* — Jeffrey Donels
(74) *Attorney, Agent, or Firm* — Cantor Colburn LLP (57) ABSTRACT

An elevator load weighing system (100) includes a brake assembly (104) configured to apply a braking force that inhibits vertical movement of an elevator car (106), and rotate in response to realizing a torque applied thereto. A position monitoring mechanism (112) is coupled to the brake assembly (104) and is configured to output a position signal in response to a rotation of the brake assembly (104). An electronic elevator control module (102) is configured to determine a zero-torque position of the brake assembly (104) prior to engaging the brake assembly (104). The electronic elevator control module (102) is further configured to detect at least one rotational brake displacement of the brake assembly (104) based on the position signal.

15 Claims, 9 Drawing Sheets

(51) Int. Cl.
*B66B 5/14* (2006.01)
*G01G 19/52* (2006.01)
*G01G 19/14* (2006.01)

(58) Field of Classification Search
USPC .......................................................... 187/393
See application file for complete search history.

(56) References Cited

U.S. PATENT DOCUMENTS

| | | |
|---|---|---|
| 5,615,864 A | 4/1997 | Liebetrau et al. |
| 5,852,264 A | 12/1998 | Muller |
| 6,305,503 B1 | 10/2001 | Suzuki et al. |
| 6,860,161 B2 | 3/2005 | Yamakawa et al. |
| 8,104,586 B2 | 1/2012 | Traktovenko et al. |
| 2017/0349403 A1* | 12/2017 | Kattainen ............. B66B 5/0025 |

FOREIGN PATENT DOCUMENTS

| | | |
|---|---|---|
| JP | 2006321642 A | 11/2006 |
| JP | 2008019071 A | 1/2008 |
| JP | 2008127187 A | 6/2008 |
| JP | 2009091124 A | 4/2009 |
| JP | 2011037552 A | 2/2011 |
| JP | 2013014406 A | 1/2013 |
| WO | 2013182742 A1 | 12/2013 |

* cited by examiner

ELEVATOR LOAD WEIGHING SYSTEM

CROSS REFERENCE TO RELATED APPLICATIONS

This application is a National Stage Application of International Patent Application Serial No. PCT/US2015/049333, filed Sep. 10, 2015, which claims benefit to U.S. Provisional Application No. 62/049,533, filed Sep. 12, 2014, which are incorporated herein by reference in their entirety.

TECHNICAL FIELD

The present invention relates generally to elevator systems, and more particularly, to a load weighing system of an elevator system.

BACKGROUND

Elevator systems typically include a load weighing subsystem to provide information regarding a load applied to an elevator car. Conventional load weighing systems typically utilize load cells configured to directly detect a load applied to the elevator car. The load cells are disposed in a void between the elevator car and the hoistway frame. Recent elevator cars, however, have been designed as unibody cars which eliminate the void needed for disposing the load cells.

Alternatively, load cells can be coupled to the elevator car ropes to measure the rope tension. A change in the rope tension is then detected to determine when a load is applied to the elevator car. Friction realized by the elevator car ropes, however, can affect the measured tension and therefore vary the overall approximated detection and/or weight of the load.

SUMMARY

According to an embodiment, an elevator load weighing system includes a brake assembly configured to apply a braking force that inhibits vertical movement of an elevator car. The brake assembly is further configured to rotate in response to realizing a torque applied thereto. A position monitoring mechanism is coupled to the brake assembly and is configured to output a position signal in response to a rotation of the brake assembly. An electronic elevator control module is configured to determine a zero-torque position of the brake assembly prior to engaging the brake assembly. The electronic elevator control module is further configured to detect at least one rotational brake displacement of the brake assembly based on the position signal.

In addition to one or more of the features described above or below, further embodiments include:

a feature, wherein the elevator control module determines a load applied to the elevator car based on a plurality of brake displacements of the brake assembly, and determines an overload condition of the elevator car when the plurality of rotational brake displacements exceeds a threshold value;

a feature, wherein the position monitoring mechanism is coupled to the brake assembly and is configured to rotate among a plurality of rotational positions in response to a rotational displacement of the brake assembly, the position signal indicating at least one of an upward displacement or a downward displacement of the elevator car;

a feature, wherein the load is determined according to a rotational position differential between the zero-torque position and a second rotational position after engaging the brake assembly;

a feature, wherein the elevator control module detects a power loss of the elevator car and re-initializes the zero-torque position in response to detecting an initial rotational position output from the position monitoring mechanism after restoring power to the elevator car;

a feature, wherein a drive system controls the vertical displacement of the elevator car, and wherein the elevator control module commands the drive system to apply a pre-torque force on the brake assembly prior to disengaging the brake assembly, the pre-torque force returning the brake assembly to the zero-torque position;

a feature, wherein the pre-torque force is based on a sum of the rotational brake displacements; and a feature, wherein the position monitoring mechanism is a rotary encoder, the brake assembly includes a disc spring units that elastically moves between a biased position corresponding to the zero-torque position, and wherein the rotational positions of the rotary detector have a linear relationship with respect to the torque and the pre-torque force.

In yet another embodiment, a method of determining a load of an elevator car comprises rotating a brake assembly configured to apply a braking force that inhibits the vertical movement of the elevator car. The brake assembly rotates in response to realizing a torque applied thereto. The method further includes outputting a position signal in response to rotating brake assembly. The method further includes determining a zero-torque position of the brake assembly prior to engaging the brake assembly and to detecting at least one rotational brake displacement of the brake assembly based on the position signal.

In addition to one or more of the features described above or below, further embodiments include:

a feature of determining a load applied to the elevator car based on a plurality of rotational brake displacements of the brake assembly, and determining an overload condition of the elevator car when the plurality of brake displacements exceeds a threshold value;

a feature of determining at least one of an upward displacement or a downward displacement of the elevator car based on at least one rotational brake displacement;

a feature of determining the load based on a rotational position differential between the zero-torque position and a second rotational position after engaging the brake assembly;

a feature of detecting a power loss of the elevator car and re-initializing the zero-torque position in response to detecting a first rotational brake displacement of the brake assembly after restoring power to the elevator car;

a feature of applying a pre-torque force on the brake assembly prior to disengaging the brake assembly, the pre-torque force returning the brake assembly to the zero-torque position; and a feature of determining the pre-torque force based on a sum of the rotational brake displacements.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1A:
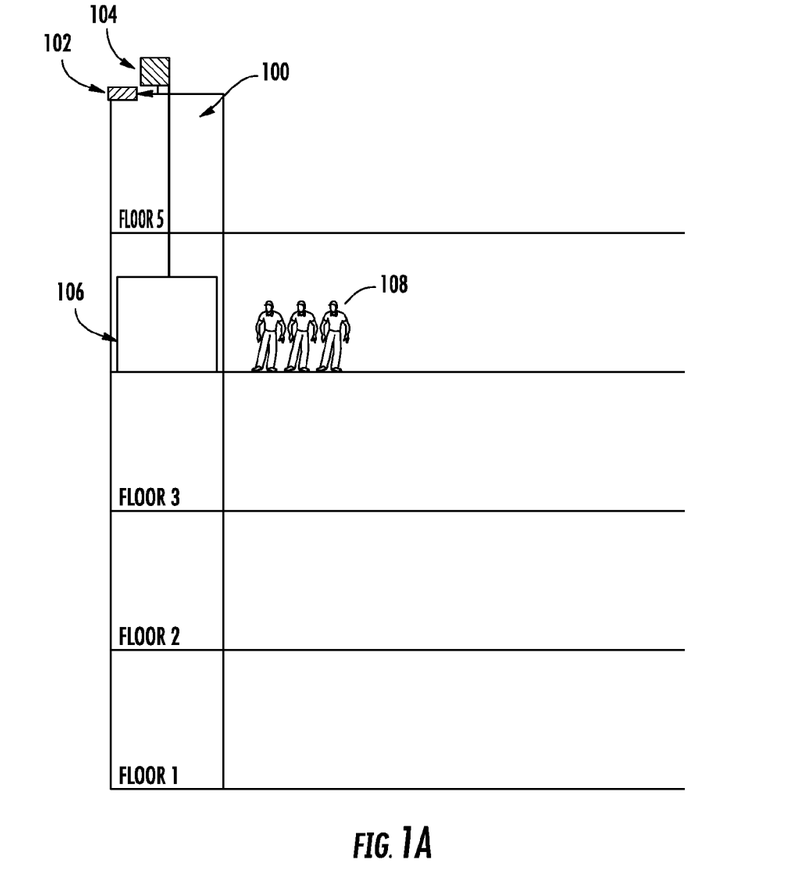
FIGS. 1A-1B illustrate a positional displacement of an elevator car in response to an added load according to an embodiment.
Figure 1B:
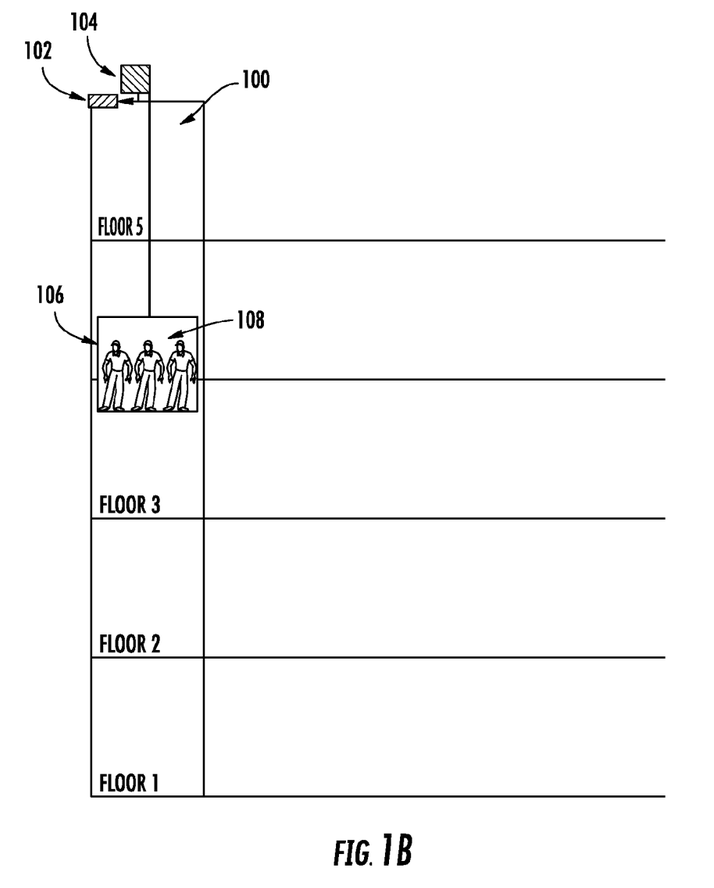

Referring to FIGS. 1A-1B, an elevator load weighing system 100 is illustrated according to an embodiment. The elevator load weighing system 100 includes an electronic elevator control module 102, and a brake assembly 104. Brake assembly 104 may be part of a machine that imparts movement to elevator car 106. The elevator control module 102 includes an electronic microcontroller, for example, configured to control the operation of the brake assembly 104 and the elevator car 106 as understood by one of ordinary skill in the art. The brake assembly 104 is selectively engaged to apply a braking force that inhibits vertical movement of an elevator car 106. When engaged, the brake assembly 104 realizes a torque applied by the total weight of the elevator car 104. The total weight of the elevator car includes, for example, the weight of an empty elevator car 106, a counter weight coupled to the elevator car, and the weight of a load applied to the elevator car. The load includes, for example, passengers, or goods such as furniture, packages, etc.

The brake assembly 104 is configured to rotate when realizing a torque applied thereto. The torque is induced by in response to applying the braking force. A change in load realized by the elevator car 106 after applying the braking force can further increase the torque applied to the brake assembly 104. As illustrated in FIG. 1A, for example, an empty elevator car 106 is parked just after the brake assembly 104 is engaged. In this scenario, the only force applied to the brake assembly 104 is the weight of the empty elevator car 106. It is appreciated by those of ordinary skill in the art that the elevator car 106 may include a counterbalance weight which may be factored into the total weight applied to the brake assembly 104.

As illustrated in FIG. 1B, the vertical position of the elevator car 106 is displaced as a load 108 is applied, which in this example includes passengers 108 boarding the elevator car 106. In response to the added load 108, the brake assembly 104 rotates with respect to a fixed reference point such as, for example, the frame of the elevator car 106. The rotation of the brake assembly 104 is used to determine how the load 108 affects the vertical position of the elevator car 106 as discussed in greater detail below.

Figure 2A:
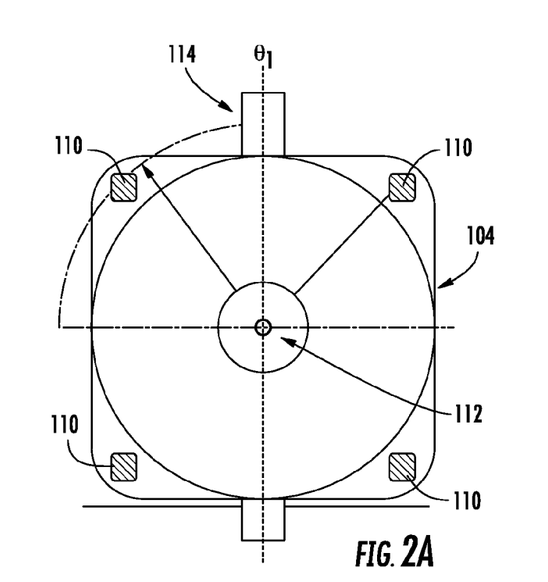
FIGS. 2A-2B illustrate a brake assembly rotating between a zero-torque position and a second position in response to a torque induced by a positional displacement of an elevator car according to an embodiment.
Figure 2B:
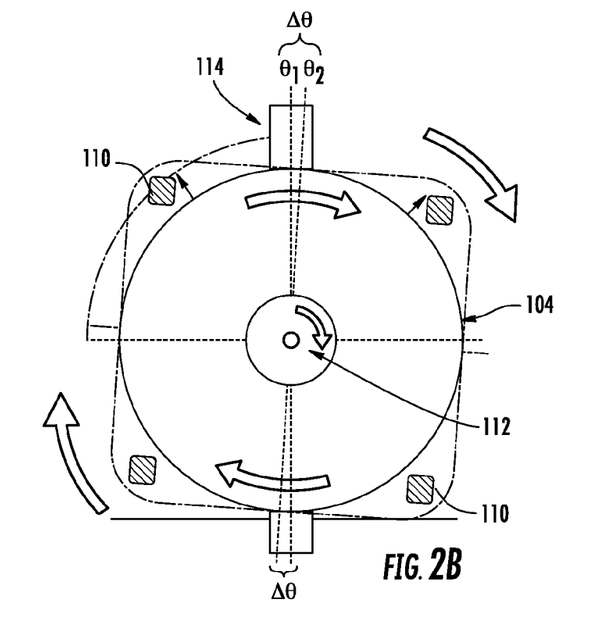

Turning now to FIGS. 2A-2B, a brake assembly 104 is illustrated according to an embodiment. The brake assembly 104 includes one or more rotation mechanisms 110 and a position monitoring mechanism 112. According to an embodiment, the rotation mechanisms 110 are coupled to the brake assembly 104 at respective housings located 90 degrees apart from one another. The rotation mechanisms 110 are configured to allow the brake assembly 104 to rotate with respect to a fixed point such as, for example, a bedplate supporting the elevator machine or housing of the brake assembly. The rotation mechanisms 110 may be formed as spring units, for example, as discussed in greater detail below. Although four rotation mechanisms 110 are illustrated, it is appreciated that more or less rotation mechanisms 110 may be used to allow rotation of the brake assembly 104.

The position monitoring mechanism 112 is coupled to the brake assembly 102 and is configured to output a position signal in response to detecting a rotational displacement of the brake assembly 104. According to an embodiment, the position monitoring mechanism 112 is a rotary encoder 112 configured to rotate among a plurality of rotational positions as understood by one of ordinary skill in the art. The rotary encoder 112 rotates along with the rotation of the brake assembly 104 and outputs the position signal (i.e., a pulse) in response to rotating from a first encoder position to a second encoder position. According to an embodiment, the rotary encoder 112 has 1024 positions per revolution (PPR). It is appreciated, however, that the rotary encoder 112 can range from 512 PPR to 4096 PPR. The position signal is output to the elevator control module 102. The elevator control module 102 applies a directional operator (e.g., a positive direction or a negative direction) corresponding to each pulse output from the position monitoring mechanism 112. The pulses indicated by each position signal indicates a displacement of the brake assembly 104 and ultimately indicates an upward movement or a downward movement of the elevator car 106 in response to a change in the load 108.

Referring to FIG. 2A, the brake assembly 104 is illustrated in a first position with respect to the elevator frame 114 ($\theta_1$). The first position includes, for example, a zero-torque position occurring when the brake assembly 104 is disengaged (i.e., a braking force is not yet applied to the elevator car 106). Turning to FIG. 2B, the brake assembly 104 is rotated in a clockwise direction in response to realizing a torque. The torque can be applied to the brake assembly 104 when the elevator car realizes a load such as, for example, when the break assembly 104 is engaged. As discussed above, the torque realized by the brake assembly 104 can be varied as the load applied to elevator car 106 varies while the brake assembly 104 is engaged. In this manner, the brake assembly 104 rotates from the first position ($\theta_1$) into a second position ($\theta_2$). A position differential ($\Delta\theta$) is defined as the rotational difference between the first position ($\theta_1$) and the second position ($\theta_2$).

Figure 3:
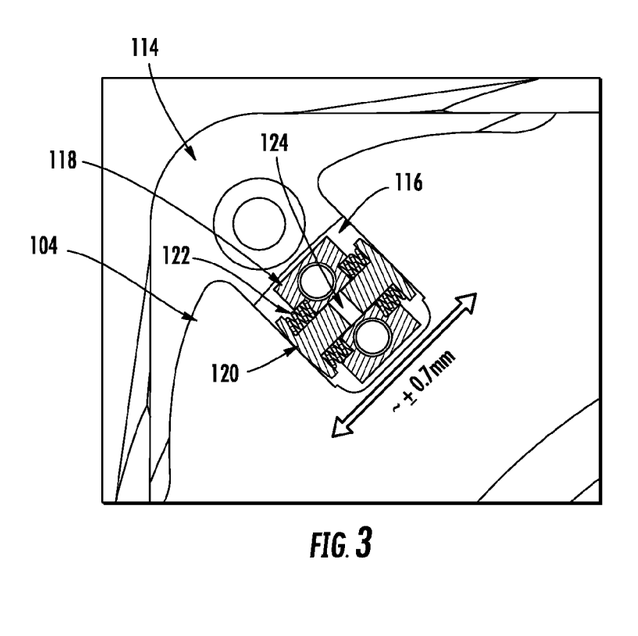
FIG. 3 illustrates a rotation mechanism configured to allow a brake assembly to rotate with respect to a fixed portion of an elevator car according to an embodiment.

Referring to FIG. 3, a rotation mechanism 110 is illustrated according to an embodiment. The rotation mechanism 110 is assembled as, for example, a disc spring unit 110 disposed in a respective spring well 116 formed in the brake assembly 104. The disc spring unit 110 includes a spring housing 118, a pair of moveable disc pistons 120, and a pair of springs 122. Each disc piston 120 includes a first end and a second end. The first end of each disc piston 120 is disposed in a bore 124 formed in the spring housing 118 and is configured to slide therein. The second end of each disc piston 120 extends from the bore 124 and contacts an inner wall of the spring well 116. A spring 122 is interposed between the second end of the disc piston 120 and the spring housing 118. Each spring 122 forces the second end of a respective disc piston 120 against the inner wall of the spring well 116.

When a torque is applied to the brake assembly 104, the brake assembly 104 is rotated in either a clockwise or counter-clockwise direction from a first position into a second position. In response to the brake assembly rotation, a first spring 122a, 122b is compressed allowing a respective disc piston 120 to side toward the spring housing 118, while the second spring 122 extends allowing the respective disc piston 120 to slide away spring housing 118. In this manner, the brake assembly 104 is allowed to rotate with respect to the elevator frame 114. According to an embodiment, the brake assembly 104 can rotate, for example, approximately 0.7 millimeters (mm) in the clockwise or counterclockwise direction. When the torque is removed, the springs 122 return to their biased states such that brake assembly 104 returns to the first position (e.g., the zero-torque position).

Figure 4A:
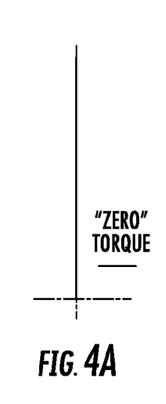
FIGS. 4A-4E are linear expressions of a rotational displacement of a brake assembly according to an embodiment.

The rotational positional displacement of the rotary encoder 112 can be expressed as a linear relationship with respect to the torque applied to the brake assembly 104 as illustrated in FIGS. 4A-4E. Referring to FIG. 4A, the brake assembly 104 is in a first state that exists prior to engaging the brake assembly 104. Since the brake assembly 104 is not engaged, no torque is applied to the brake assembly 104. The elevator car 106 can include an initial load or can be empty during this state prior to engaging the brake assembly 104. According to an embodiment, the zero-torque position is measured when the elevator car 106 is stationary and level with a floor landing and the time period is, for example, approximately 1-3 seconds before the brake assembly 104 is engaged.

Figure 4B:
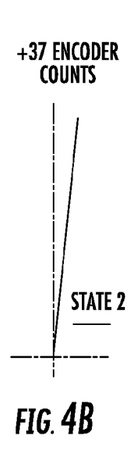

At FIG. 4B, the brake assembly 104 is engaged at a second state such that the braking force is applied. After the brake assembly 104 is engaged, it is appreciated that the elevator car 106 can experience a slippage effect that displaces the elevator car 106 in a first direction with respect to the zero-torque position (e.g., forces the elevator downward from the zero-torque position). The elevator car slippage applies a torque on the brake assembly 104, which in turn rotates the brake assembly 104 as discussed above. The rotary encoder 112 is rotated 37 positions in a clockwise direction, for example, as the brake assembly 104 rotates and outputs a plurality of position signal pulses indicating the 37 clockwise rotations of the rotary encoder 112. The elevator control module 102 receives the position signals and stores a positive value (+37) in memory indicating the 37 clockwise rotations.

Figure 4C:
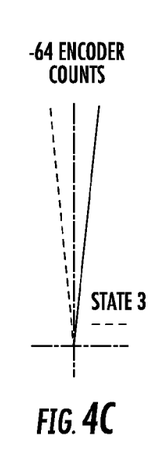

Turning to FIG. 4C, the elevator car 106 realizes a reduction in load at a third state. The reduced load displaces the elevator car 106 in an opposite direction with respect to the zero-torque position (e.g., raises the elevator upward) and applies a torque on the brake assembly 104, which in turn rotates the brake assembly 104 in the counterclockwise direction. Accordingly, the rotary encoder 112 is rotated 64 positions in the counterclockwise direction, for example, and outputs a plurality of position signal pulses indicating the 64 counterclockwise rotations of the rotary encoder 112. The elevator control module 102 receives the position signals and stores a negative value (−64) in memory indicating the 64 counterclockwise rotations.

Figure 4D:
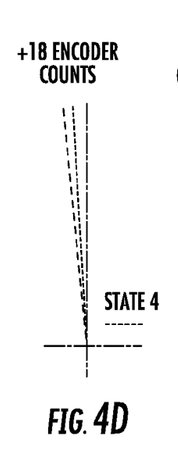

At FIG. 4D, a new load is added to the elevator car 106 at a fourth state. The new load increases the weight of the elevator car 106 with respect to the weight of the elevator car 106 at the third state. The new load therefore displaces the elevator car 106 again in the first direction (e.g., forces the elevator downward) and applies a torque on the brake assembly 104, which in turn rotates the brake assembly 104 again in the clockwise direction. The rotary encoder 112 is rotated 18 positions in the clockwise direction, for example, and outputs a plurality of position signal pulses indicating the 18 clockwise rotations of the rotary encoder 112. The elevator control module 102 receives the position signals and stores a positive value (+18) in memory indicating the 18 clockwise rotations.

Figure 4E:
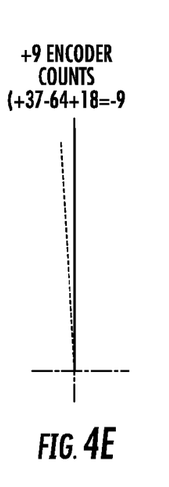

Turning to FIG. 4E, the elevator control module 102 determines that the brake assembly 104 can be returned to the zero-torque position if the elevator car 106 is moved such that the brake assembly is displaced 9 clockwise rotations with respect to the fourth state. For example, the elevator control module 102 determines the net differential ($\Delta\theta$) of the position signal pulses (i.e., 37+(−64)+18=(−9)) to determine a displaced position of the brake assembly 104. In the fourth state, for example, the brake assembly is displaced 9 counterclockwise rotational positions (−9) with respect to the zero-torque position of the first state illustrated in FIG. 4A. The elevator control module 102 therefore determines that brake assembly 104 can be displaced 9 clockwise rotational positions (+9) to return the brake assembly 104 the zero-torque position (i.e., (−9)+9=0). According to an embodiment, the elevator control module 102 can command the elevator motor to output a pre-torque force that moves the elevator car upward, thereby displacing the brake assembly 9 clockwise rotational positions. Once the brake assembly 104 is returned to the zero-torque position, the brake assembly 104 can be disengaged and the elevator car 106 can be dispatched with a reduction in jerk.

According to an embodiment, the elevator control module 102 can determine an overload condition of the elevator car 106. More specifically, the elevator control module 102 sets a rotational position differential threshold ($\Delta\theta_{TH}$). The rotational position differential threshold $\Delta\theta_{TH}$ corresponds, for example, to approximately 105% duty load of the elevator car 106. The elevator control module 102 then compares $\Delta\theta$ to $\Delta\theta_{TH}$. When $\Delta\theta$ exceeds $\Delta\theta_{TH}$ (e.g., 105% duty load), the elevator control module 102 determines an overload condition of the elevator car 106. In response to the overload condition, the elevator control module 102 can halt operation of the elevator car 106 and output one or more alerts including, but not limited to, a sound alert, and a display alert. In this manner, an overload condition may be determined while the elevator doors are open and without re-leveling the elevator car 106. When the overload condition is removed (e.g., 85% duty load of the elevator car 104 or less is determined) the elevator control module 102 can resume operation of the elevator car 106.

According to another embodiment, the elevator control module 102 performs an initialization and rise compensation operation to compensate for weight imbalances realized by the elevator car 106 as the elevator car 106 travels from the lowest building floor to the highest building floor. More specifically, an empty elevator car 106 is run from the lowest building floor landing to the following floor landing and back. The elevator control module 102 determines a number of pulses output from the rotary encoder 112 based on an empty car and a zero-torque position at the bottom floor landing. A first rotational position differential threshold ($\Delta\theta_{TH\_1}$) is then set which corresponds to an overweight condition at the bottom floor landing.

The empty elevator car 106 is then run to the highest building floor and the elevator control module 102 determines a number of pulses output from the rotary encoder 112 based on an empty car and a zero-torque position at the top floor landing. A second rotational position differential threshold ($\Delta\theta_{TH\_2}$) is then set which corresponds to an overweight condition at the highest floor landing. The elevator control module 102 can then determine how the rope weight vs. rise affects the elevator car based on a comparison between the $\Delta\theta_{TH\_1}$ and $\Delta\theta_{TH\_2}$.

According to another embodiment, the elevator control module 102 performs a power loss re-initialization operation after realizing loss of power to the elevator car 106. More specifically, the elevator control module 102 detects an abnormal event such as, for example, a power outage. When power is restored to the elevator car 106, the elevator control module 102 confirms that the elevator car doors are closed and is capable of automatically re-calibrating the zero-torque position of the brake assembly 104. In a first scenario, the elevator control module 102 retrieves the zero-torque position previously stored in memory and controls the elevator motor to adjust the position of the elevator car 106 and gradually achieve the zero-torque position.

According to a second scenario, the elevator control module 102 assumes that the elevator car 106 experienced a slippage effect during the abnormal event. Based on this assumption, the elevator control module 102 controls the elevator motor to gradually raise the elevator car 106 until one or more position signal pulses are received from the rotary encoder 112. Once the position signal pulses are received, the elevator control module 102 determines that the brake assembly 104 is returned to approximately the zero-torque position and the brake assembly 104 is disengaged. In this manner, abrupt jerking of the elevator car 106 following an emergency stop event may be reduced.

Figure 5:
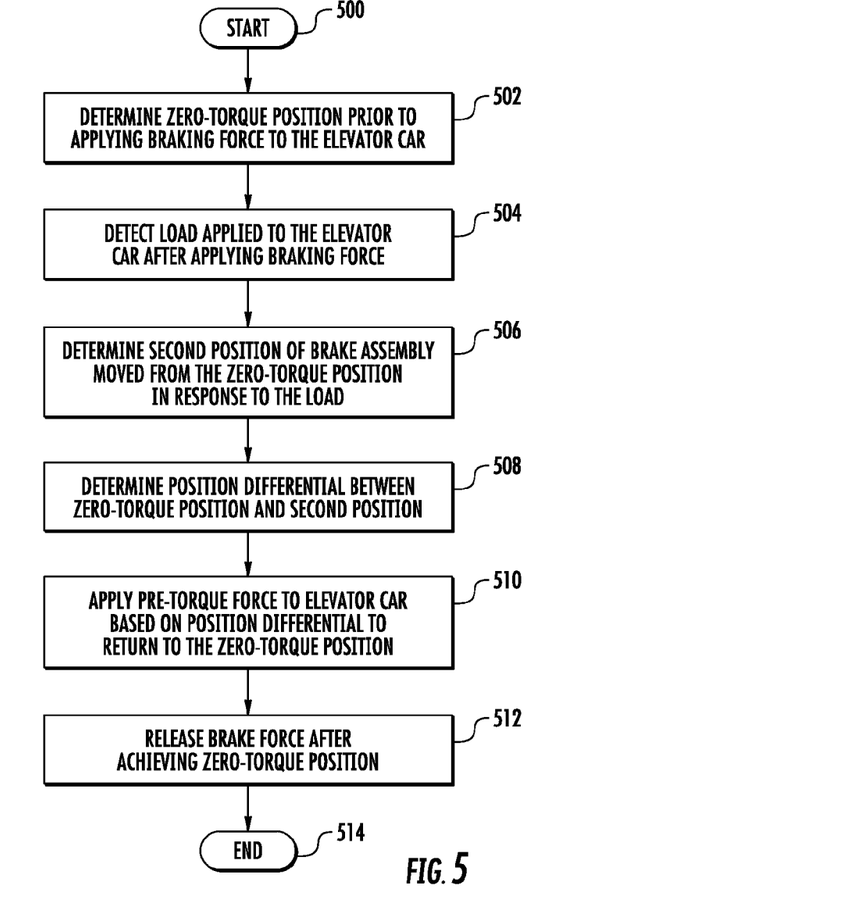
FIG. 5 is a flow diagram illustrating a method of returning an elevator car to a zero-torque position according to an embodiment.

Referring now to FIG. 5, a flow diagram illustrates a method of returning an elevator car to a zero-torque position according to an embodiment. The method begins at operation 500, and at operation 502 a zero-torque position of a brake assembly is determined prior to applying a braking force to the elevator car. At operation 504, a load applied to the elevator car is detected after applying the braking force. At operation 506, a second position of the brake assembly is determined. According to an embodiment, the second position is a displaced rotational position of a brake assembly with respect to the zero-torque position induced by the applied load. At operation 508, a position differential between the second position and the zero-torque position is determined. At operation 510, a pre-torque force is determined based on the position differential, and the pre-torque force is applied the braking assembly to return to the pre-torque position. At operation 512, the braking force is removed from the elevator car and the method ends at operation 514.

Figure 6:
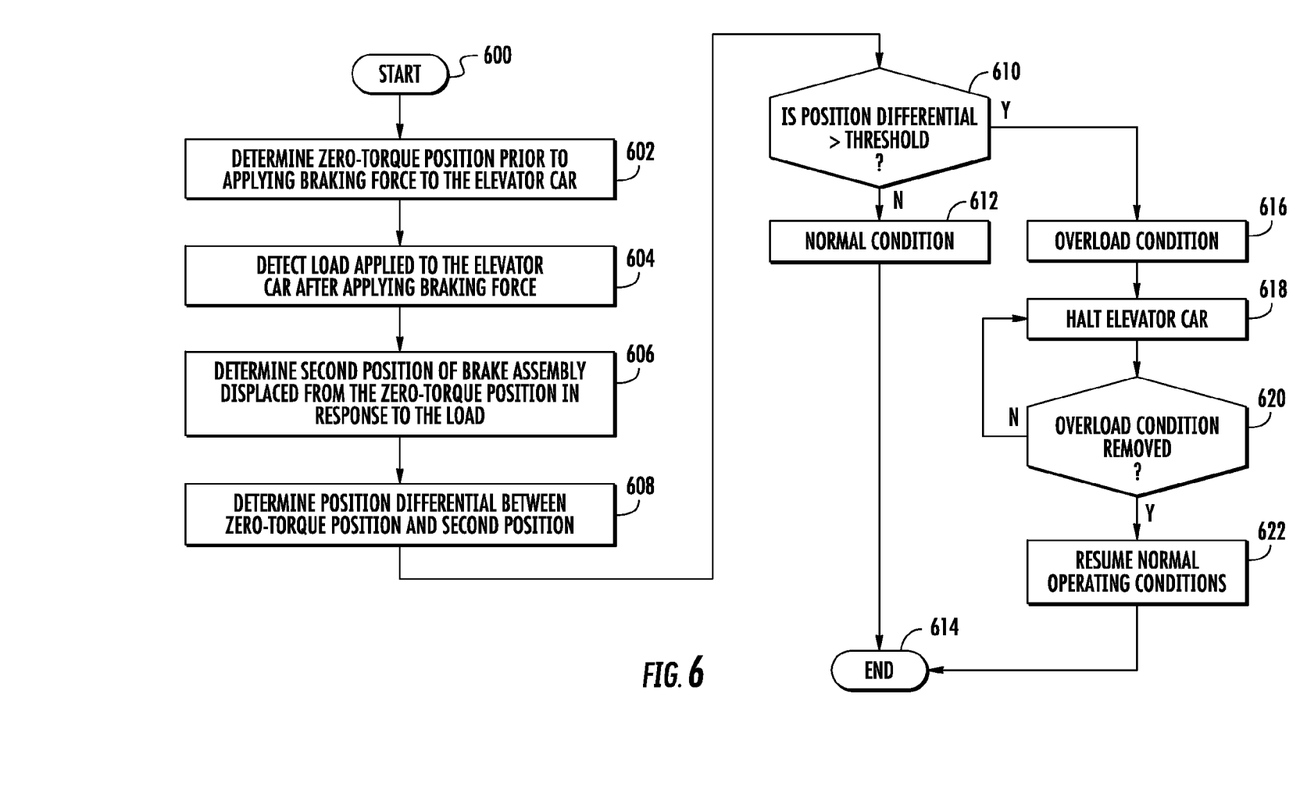
FIG. 6 is a flow diagram illustrating a method of determining an overload condition of an elevator car according to an embodiment.

Turning now to FIG. 6, a flow diagram illustrates a method of determining an overload condition of an elevator car according to an embodiment. The method begins at operation 600, and at and at operation 602 a zero-torque position of a brake assembly is determined prior to applying a braking force to the elevator car. At operation 604, a load applied to the elevator car is detected after applying the braking force. At operation 606, a second position of the brake assembly is determined. According to an embodiment, the second position is a displaced rotational position of a brake assembly with respect to the zero-torque position induced by the applied load. At operation 608, a position differential between the second position and the zero-torque position is determined. At operation 610, the position differential is compared to a position differential threshold. When the position differential does not exceed the threshold, a normal condition is determined at operation 612 and the method ends at operation 614. The normal condition allows an elevator car to continue operating as normal without interruption. When, however, the position differential exceeds the threshold, an overload condition is determined at operation 616, and the elevator car is halted at operation 618. At operation 620, a determination is made as to whether the overload condition is removed. If the overload condition is not removed, the elevator car remains halted at operation 618. When, however, the overload condition is removed, the elevator car is returned to normal operating conditions at operation 622 and the method ends at operation 614.

Figure 7:
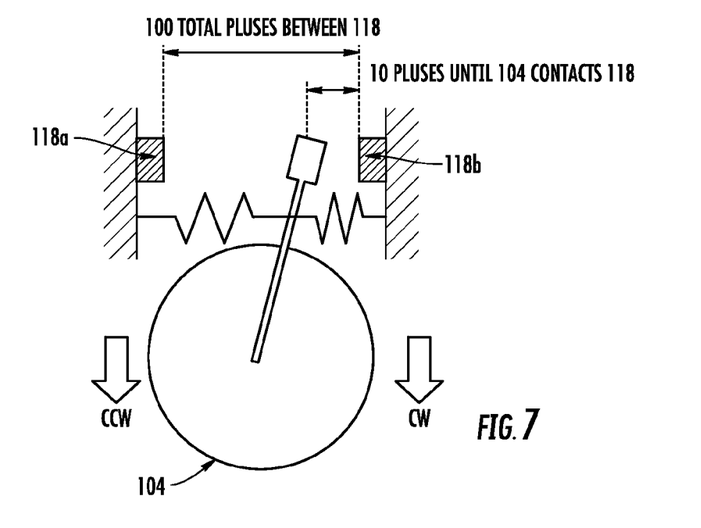
FIG. 7 illustrates a brake assembly according to another embodiment.

Turning now to FIG. 7, a rotation mechanism 110 is illustrated according to another embodiment. The spring housing 118 is shown to have a first sidewall 118a and an opposing second sidewall 118b. The total number of pulses for the brake assembly 104 to rotate between the opposing sidewalls 118a-118b is predetermined. For example, the total number of pulses for the brake assembly 104 to rotate between the opposing sidewalls 118a-118b is 100 pulses. When the brake is engaged, a driving torque is applied to the brake assembly 104, which rotates the brake assembly 104 in a clockwise example, for example. The number of pulses (i.e., contact pulses) in response to rotating the brake assembly 104 is counted until the brake assembly 104 abuts against the second sidewall 118b. In this case, for example, 10 pulses are counted until the brake assembly 104 contacts the second sidewall 118b. A balanced pulse count can be determined using the following equation:

$P_B = (P_T/n) - P_C$, where $P_B$=the balanced pulse count;
$P_T$=the total pulse count;
n=the number of brake assembly sidewalls; and
$P_C$=the number of contact pulses In the case described above, the balanced pulse count is determined as follows:

$P_B = (100/2) - 10$, where $P_B$ is calculated to be 40

Accordingly, a pre-torque force can be applied to rotate the brake assembly 104 according to the balanced pulse count, i.e., 40 pulses, in a clockwise direction from the first sidewall 118a. In this manner, the brake assembly 104 is determined to be balanced and the brake assembly can be disengaged.

According to another embodiment, a servo-lock initialization feature can be used to determine a pre-torque force. More specifically, during initialization and prior to lifting the brake, no pulses are counted and there is no estimation of the pre-torque. When the brake is lifted during initialization, the elevator control module 102 controls the elevator motor to maintain zero speed with respect to a calculated pre-torque. The elevator control module 102 further includes a position feedback control loop circuit that determines a displacement of the elevator car after the brake is lifted. When the brake is lifted, the elevator control module 102 controls the elevator motor to maintain the position of the car thereby initiating a servo-lock mode. The elevator control module 102 analyzes the gain signal provided by the position feedback control loop circuit. A high gain indicates a high position loop gain in position feedback loop. As the gain changes from high gain to low gain, the pulses of the encoder are counted indicating displacement of the elevator car. Based on the counted pulses, the pre-torque force is determined as discussed above.

Figure 8:
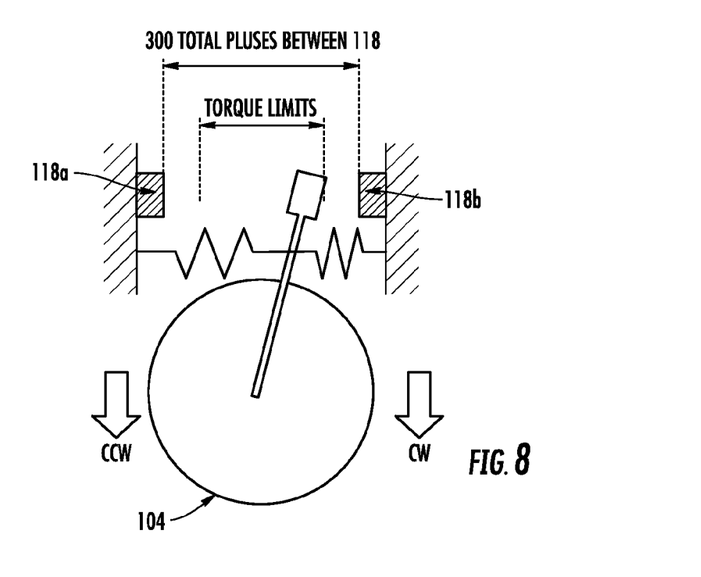
FIG. 8 illustrates a brake assembly according to still another embodiment.

Turning now to FIG. 8, a rotation mechanism 110 is illustrated according to another embodiment. In this case, a first torque limit and a second torque exist in the system.

With the brake engaged, a drive torque is applied to the brake assembly 104 to rotate the brake assembly 104 toward the first torque limit (e.g., a direction of 100% applied torque). A first number of limit pulses ($P_{L1}$) (e.g., 70 pulses) are counted until the brake assembly reaches the first torque limit. An opposing drive torque is then applied to rotate the brake assembly 104 toward the second torque limit (e.g. a direction of 0% torque). A second number of limit pulses ($P_{L2}$) are counted until the brake assembly reaches the second torque limit (e.g., 130 pulses). Accordingly, a total of 200 pulses is determined between the first and second torque limits. A balanced pulse count can be determined using the following equation:

$$P_B=(P_{L2}-P_{L1})/n, \text{ where}$$

$P_B$=the balanced pulse count;
$P_{L1}$=the first number of limit pulses;
$P_{L2}$=the second number of limit pulses; and
n=the number of brake assembly sidewalls.

In the case described above, the balanced pulse count is determined as follows:

$$P_B=(130-70)/2, \text{ where } P_B \text{ is calculated to be } 30$$

Accordingly, a pre-torque force can be applied to rotate the brake assembly 104 according to the balanced pulse count. In this manner, the brake assembly 104 is determined to be balanced and the brake assembly can be disengaged.

Figure 9A:
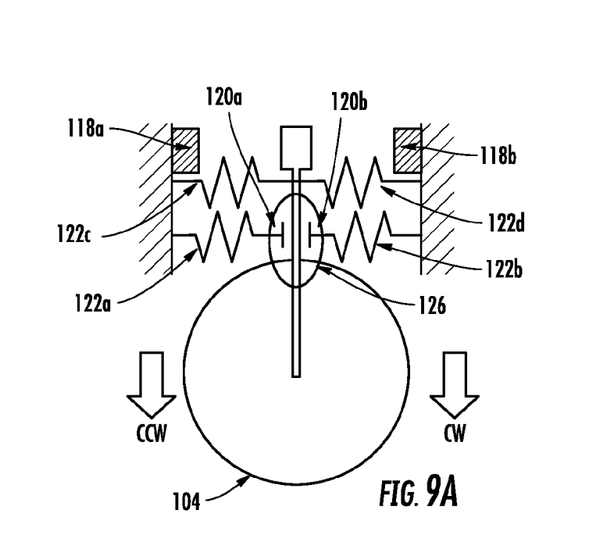
FIGS. 9A-9C illustrate a brake assembly according to yet another embodiment.
Figure 9B:
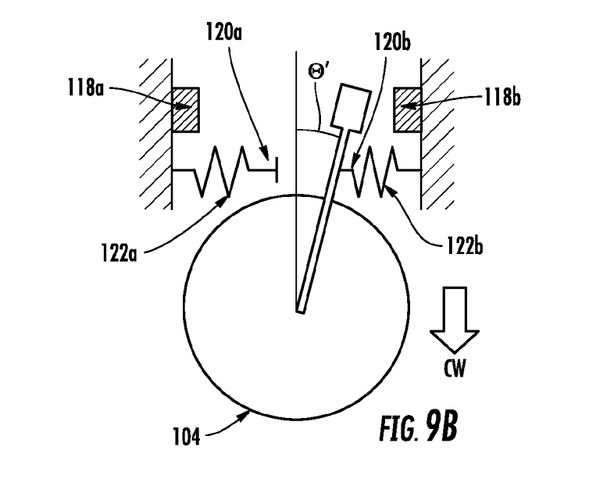
Figure 9C:
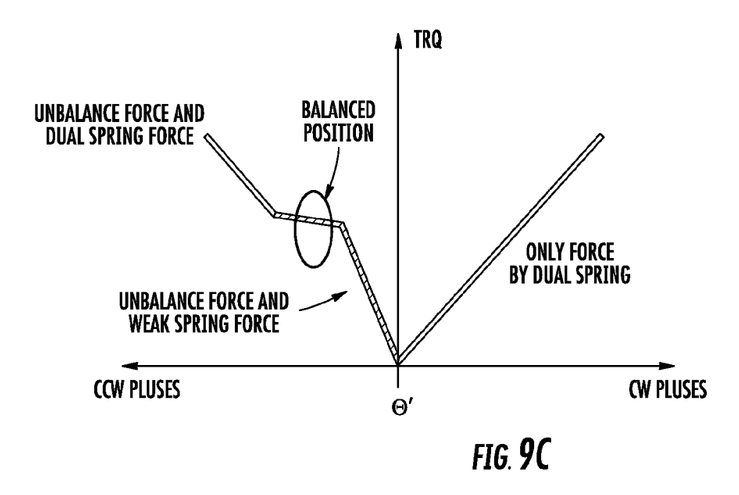

Turning now to FIGS. 9A-9C, a rotation mechanism 110 is illustrated according to another embodiment. When the brake assembly 104 is balanced, the disc pistons 120 are in a neutral position and a gap 126 exists in the bore 124 (see FIG. 9a). As the brake assembly is rotated a distance (θ') with respect to the neutral position, an elastic force is applied by the springs 122a-122b on a respective disc piston 120. According to an embodiment, an additional set of springs 122c-122d can be included to provide a dual-spring force (see FIG. 9B). The applied elastic force can be determined using, for example, a sensor coupled to the respective spring 122a-122b. When the brake is engaged and torque is applied such that the brake assembly 104 is rotated in a first direction (e.g., a clockwise direction), the brake assembly 104 is driven to rotate in an opposing second direction (e.g., the counter-clockwise direction) until no elastic force is applied disc pistons 120. As shown in FIG. 9C, a neutral position can be determined when the elastic force reaches a plateau (i.e., is flat). Accordingly, it is determined the brake assembly 104 has been returned to the neutral position and the brake assembly 104 is balanced.

According to another embodiment, the total number of pulses can be determined following initial contact of the brake assembly 104 against a sidewall 118a, 118b. For example, once the brake assembly 104 rotates in a clockwise direction and abuts the sidewall 118b after the brake is engaged and the number of contact pulses are determined, the brake assembly 104 can be rotated in an opposite direction (i.e., counterclockwise). The number of pulses are then counted until the brake assembly 104 contacts the opposing sidewall 118a. Thus, the total number of pulses between the opposing sidewalls 118a-118b are determined.

As used herein, the term module refers to processing circuitry that may include an application specific integrated circuit (ASIC), an electronic circuit, an electronic processor (shared, dedicated, or group) and memory that executes one or more software or firmware programs, a combinational logic circuit, and/or other suitable components that provide the described functionality.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An elevator load weighing system, comprising:
    a brake assembly configured to apply a braking force that inhibits vertical movement of an elevator car, the brake assembly configured to rotate in response to realizing a torque applied thereto;
    a position monitoring mechanism coupled to the brake assembly and configured to output a position signal in response to a rotation of the brake assembly; and
    an electronic elevator control module in electrical communication with the position monitoring mechanism, the elevator control module configured to determine a zero-torque position of the brake assembly prior to engaging the brake assembly and to detect at least one rotational brake displacement of the brake assembly based on the position signal.

2. The elevator load weighing system of claim 1, wherein the elevator control module determines a load applied to the elevator car based on a plurality of brake displacements of the brake assembly, and determines an overload condition of the elevator car when the plurality of rotational brake displacements exceeds a threshold value.

3. The elevator load weighing system of claim 2, wherein the position monitoring mechanism is coupled to the brake assembly and is configured to rotate among a plurality of rotational positions in response to a rotational displacement of the brake assembly, the position signal indicating at least one of an upward displacement or a downward displacement of the elevator car.

4. The elevator load weighing system of claim 3, wherein the load is determined according to a rotational position differential between the zero-torque position and a second rotational position after engaging the brake assembly.

5. The elevator load weighing system of claim 4, wherein the elevator control module detects a power loss of the elevator car and re-initializes the zero-torque position in response to detecting an initial rotational position output from the position monitoring mechanism after restoring power to the elevator car.

6. The elevator load weighing system of claim 3, further comprising:
    a drive system that controls the vertical displacement of the elevator car, wherein the elevator control module commands the drive system to apply a pre-torque force on the brake assembly prior to disengaging the brake assembly, the pre-torque force returning the brake assembly to the zero-torque position.

7. The elevator load weighing system of claim 6, wherein the pre-torque force is based on a sum of the rotational brake displacements.

8. The elevator load weighing system of claim 3, wherein the position monitoring mechanism is a rotary encoder, the brake assembly includes a disc spring unit that elastically moves between a biased position corresponding to the zero-torque position and a displaced position corresponding to a rotational position that is displaced with respect to the zero-torque position, and wherein the rotational positions of the rotary encoder have a linear relationship with respect to the torque and the pre-torque force.

9. A method of determining a load of an elevator car, the method comprising:
rotating a brake assembly configured to apply a braking force that inhibits the vertical movement of the elevator car, the brake assembly rotating in response to realizing a torque applied thereto;
outputting a position signal in response to rotating brake assembly; and
determining a zero-torque position of the brake assembly prior to engaging the brake assembly and to detecting at least one rotational brake displacement of the brake assembly based on the position signal.

10. The method of claim 9, further comprising determining a load applied to the elevator car based on a plurality of rotational brake displacements of the brake assembly, and determining an overload condition of the elevator car when the plurality of brake displacements exceeds a threshold value.

11. The method of claim 10, further comprising determining at least one of an upward displacement or a downward displacement of the elevator car based on at least one rotational brake displacement.

12. The method of claim 11, further comprising determining the load based on a rotational position differential between the zero-torque position and a second rotational position after engaging the brake assembly.

13. The method of claim 12, further comprising detecting a power loss of the elevator car and re-initializing the zero-torque position in response to detecting a first rotational brake displacement of the brake assembly after restoring power to the elevator car.

14. The method of claim 13, further comprising:
applying a pre-torque force on the brake assembly prior to disengaging the brake assembly, the pre-torque force returning the brake assembly to the zero-torque position.

15. The method of claim 14, further comprising determining the pre-torque force based on a sum of the rotational brake displacements.

* * * * *